US006267276B1

(12) United States Patent
Cook

(10) Patent No.: US 6,267,276 B1
(45) Date of Patent: Jul. 31, 2001

(54) STRAP-SUPPORTED FISHING POUCH WITH ROD CARRIER

(76) Inventor: James L. Cook, 528 Corona, Denver, CO (US) 80218

( * ) Notice: Subject to any disclaimer, the term of this patent is extended or adjusted under 35 U.S.C. 154(b) by 0 days.

(21) Appl. No.: 09/158,809

(22) Filed: Sep. 22, 1998

Related U.S. Application Data

(60) Provisional application No. 60/059,696, filed on Sep. 22, 1997.

(51) Int. Cl.[7] ............................... A45F 5/00; A01K 97/10
(52) U.S. Cl. ......................... 224/183; 43/54.1; 224/162; 224/200; 224/625; 224/922
(58) Field of Search ................................ 43/21.2, 54.1; 224/103, 160, 162, 183, 200, 625, 626, 908, 922

(56) References Cited

U.S. PATENT DOCUMENTS

| | | | | |
|---|---|---|---|---|
| 240,151 | * | 4/1881 | Lambert | 224/626 X |
| 1,198,202 | * | 9/1916 | Drinkard | 224/200 |
| 2,298,694 | * | 10/1942 | Haislip | 224/200 |
| 2,597,601 | * | 5/1952 | Sherman | 2/179 |
| 3,910,470 | * | 10/1975 | Swenson et al. | 224/625 X |
| 4,091,974 | * | 5/1978 | McClintock | 224/908 |
| 4,878,606 | * | 11/1989 | Miller | 224/625 |
| 5,292,042 | * | 3/1994 | Yamaguchi et al. | 224/625 X |
| 5,409,282 | * | 4/1995 | Bale | 294/152 |

* cited by examiner

*Primary Examiner*—Stephen P. Garbe
(74) *Attorney, Agent, or Firm*—John E. Reilly

(57) ABSTRACT

A carrier for fishing accessories which can be worn without interfering with the fishing operation, whether standing, sitting, or walking. Broadly, the carrier includes a pouch, carrying mechanism and fishing rod suspension device. The pouch is capable of holding many different types of fishing accessories. The versatile carrying mechanism, such as, an adjustable shoulder strap and waist strap, allows the fisherman to wear the pouch on the hip, back or shoulder, and on either the right side or left side of the body. The fishing rod suspension device supports and suspends the fishing rod from the pouch thereby freeing the fisherman's hands for rigging the line or performing other fishing operations. The carrier may also include a work surface, such as a magnetic plate, to hold fishing accessories such as flies, hooks, lures, weights, and tools.

23 Claims, 2 Drawing Sheets

STRAP-SUPPORTED FISHING POUCH WITH ROD CARRIER

CROSS-REFERENCE TO RELATED APPLICATIONS

This application claims the benefit of provisional application Ser. No. 60/059,696 filed Sep. 22, 1997, for STRAP-SUPPORTED FISHING POUCH WITH ROD CARRIER by James L. Cook.

BACKGROUND AND FIELD OF THE INVENTION

This invention relates to a carrier for fishing accessories; and more particularly relates to a novel and improved carrier for a fishing pouch to be worn by a fisherman and which facilitates holding of a fishing rod so as to free up both hands for placing lures, rigging the line, or carrying out other operations.

Various types of carriers have been devised for supporting or attaching a bag or pouch from a shoulder strap or waist belt. However, there is a particular need for a carrier system for a fishing pouch which employs a combination of a shoulder strap and waist belt which can be worn while fishing without interfering at all with the fishing operation whether in a standing, sitting or walking position; and further wherein the carrier system cooperates with the fishing bag or pouch to enable suspension of the rod and free the fisherman's hands for rigging the line or performing other operations. In this same connection, it is highly desirable to provide a convenient work station on the carrier to hold flies, hooks, lures, tools, weights, etc. while rigging the line.

In devising a suspension system or carrier for a fishing pouch, somewhat different considerations are involved than in other suspension or carrier systems. For example, the shoulder strap and waist belt must be adjustable to regulate distribution of the weight of the bag either from the shoulder or hips. Moreover, the shoulder strap will permit the wearer to loosen the waist strap to shift the bag from the back of the hip, its location while fishing, to the front of the hip to enable the wearer to look for contents in the bag or for rigging a line without the bag sliding down the wearer's body. When the bag is placed behind the hip position, the wearer can then flex or hunch up the shoulder slightly to raise the bag on the back of the hip while simultaneously tightening the waist belt to insure that the weight will be on the hip and not on the shoulder. In this regard, it is desirable to be able to accomplish any adjustments with one hand and leave the other hand free to hold the fishing rod.

SUMMARY OF THE INVENTION

It is therefore an object of the present invention to provide a novel and improved carrier for fishing accessories which may be worn by a fisherman without interfering with the fishing process.

It is second object of the present invention to provide a carrier for fishing accessories which may be worn on different parts of the body, such as the hip, back, shoulder, right side, or left side of the body, to maximize the number of different situations in which this carrier for fishing accessories may be used.

It is a third object of the present invention to provide a carrier for fishing accessories which provides means for supporting and suspending a fishing rod from the carrier without the need for the fisherman to hold the fishing rod. In this way, the fisherman may use his arms and hands for other activities such as rigging the line.

In accordance with the present invention, a carrier for fishing accessories comprises these basic elements: a pouch for holding fishing accessories, carrying means connected to the pouch adapted to be suspended from different areas of a fisherman's body thereby allowing a fisherman to carry the pouch without interfering with the fishing operation, and fishing rod suspension means attached to the pouch for suspending a fishing rod from the pouch at a selected and predetermined angle.

The above and other objects of the present invention will become more readily appreciated and understood from a consideration of the following detailed description of preferred and modified forms of the present invention when taken together with the accompanying drawings.

DETAILED DESCRIPTION OF A PREFERRED EMBODIMENT

Figure 1:
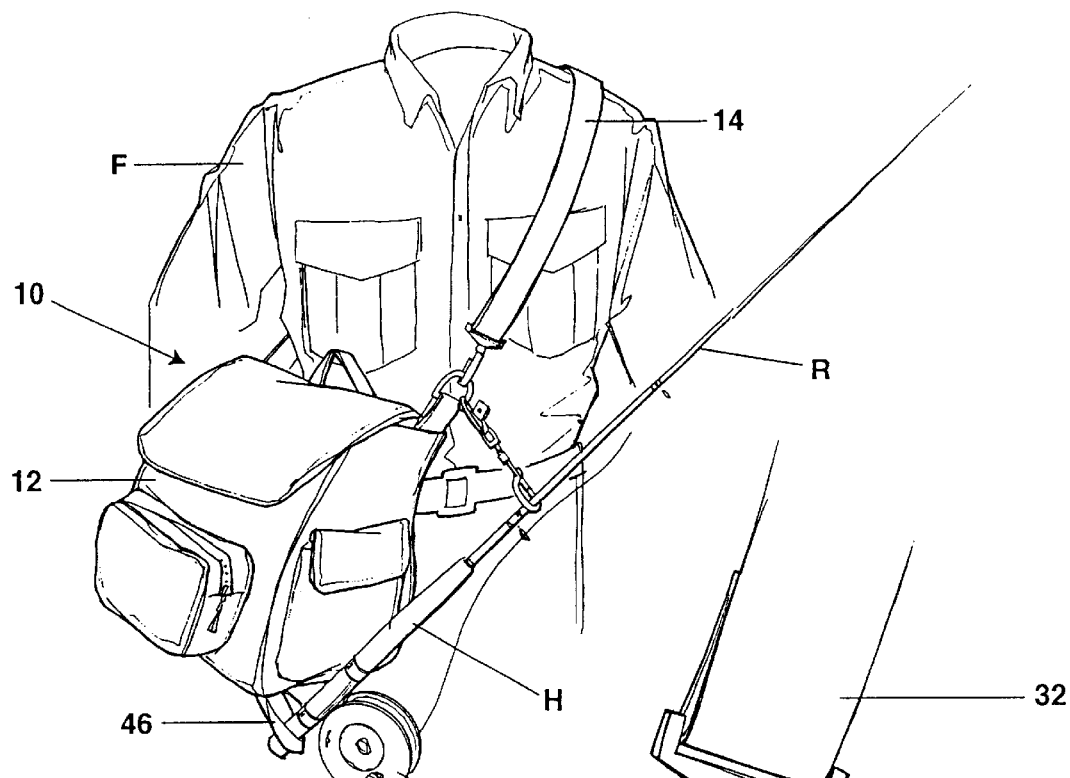
FIG. 1 is a perspective view illustrating a preferred form of carrier worn by a fisherman in accordance with the present invention.
Figure 3:
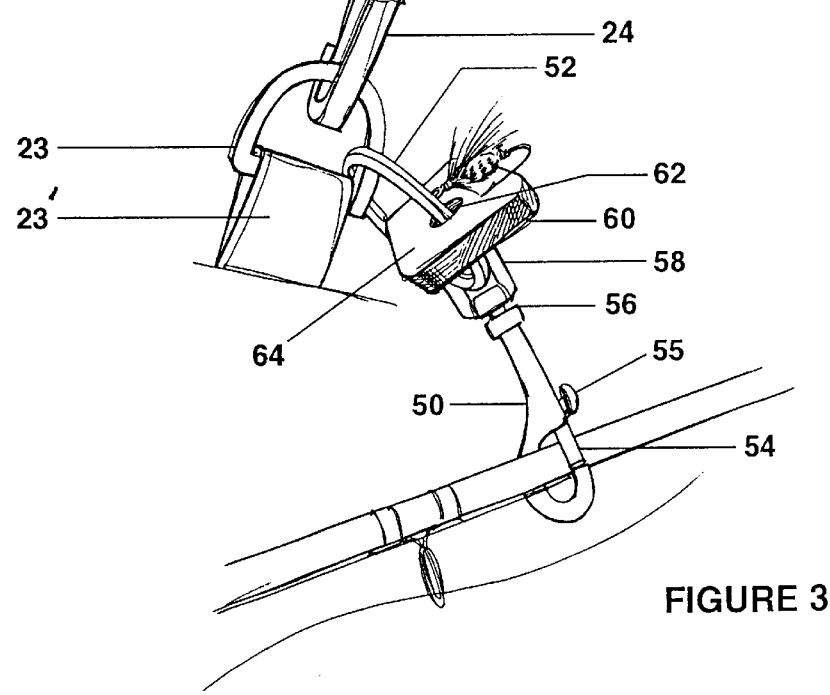
FIG. 3 is an enlarged view in more detail of a portion of the fishing rod holder and work station.
Figure 2:
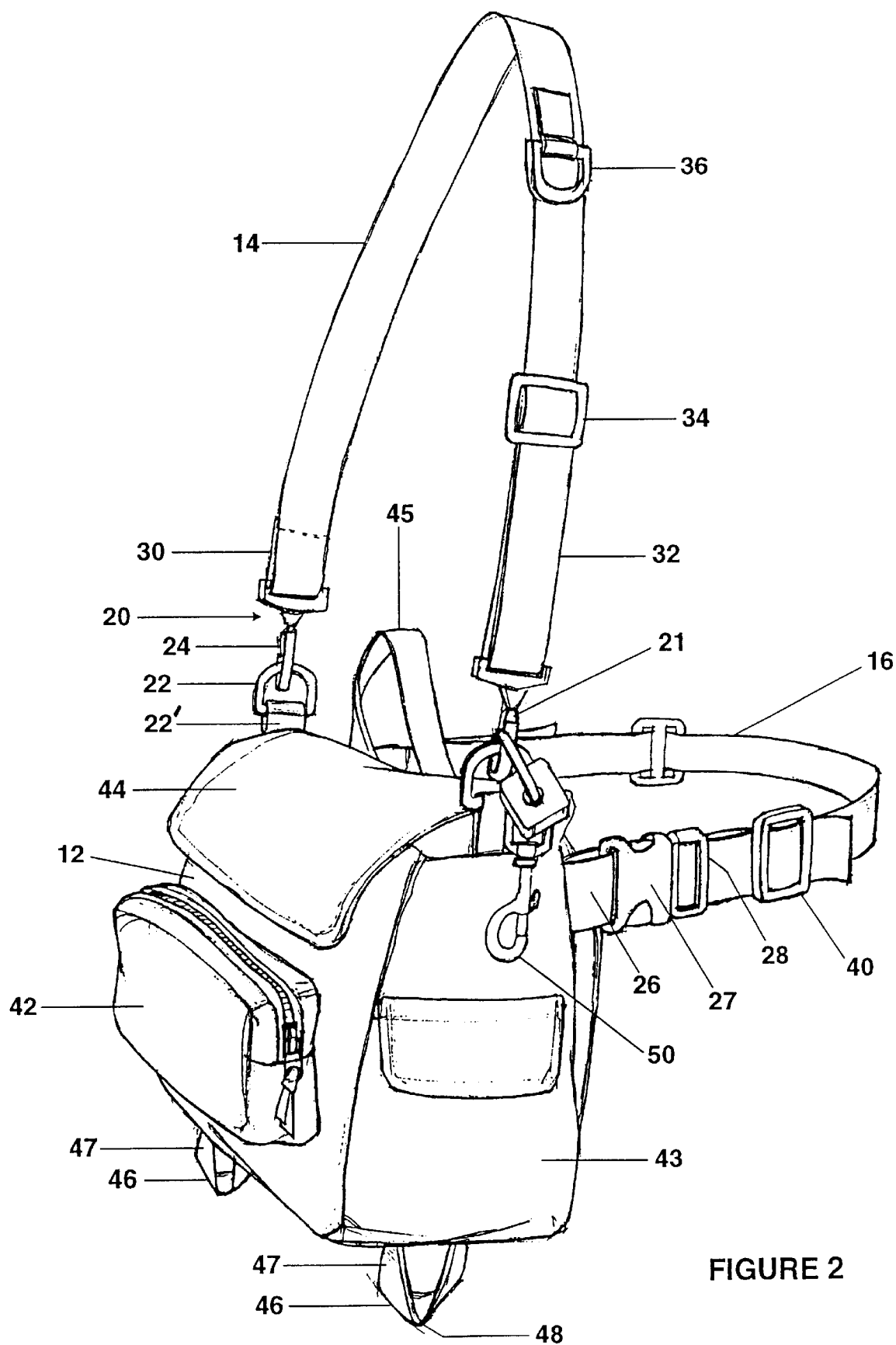
FIG. 2 is an enlarged perspective view of the preferred form of carrier shown in FIG. 1.

Referring in more detail to the drawings, there is shown in FIGS. 1 to 3 a preferred form of fishing pouch with rod carrier 10 including a fishing pouch or bag 12 to be worn on the upper torso, hip, or shoulder of a fisherman represented at F. Broadly, the pouch 12 is supported by a carrying mechanism which may include a single shoulder strap 14 and a waist strap 16. Opposite ends 20 and 21 of the shoulder strap 14 are attached to upper opposite ends 22 and 23, respectively, of the pouch 12. In turn, the waist strap 16 has opposite ends to be described releasably attached to opposite ends of the pouch 12 directly beneath the ends 20 and 21 of the shoulder strap 14.

The shoulder strap 14 may be made of a strong fabric webbing or other standard luggage strap material with a fixed end loop 30 attached to the first connecting end 20 and an adjustable end loop 32 attached to the second connecting end 21, and a conventional length adjustment device 34 is associated with the adjustable end loop 32. A D-ring 36 is attached to a midsection of the strap, the strap being of sufficient length to extend across the back and one shoulder, then downwardly across the chest of an adult person.

Each of the first and second connecting ends 20 and 21 of the shoulder strap preferably include a releasable latching device, such as, a spring clip 24 which can be depressed to receive the complementary connecting end 22 or 23 of the pouch. Each complementary end 22, 23 is defined by an upper D-ring suspended from an upper fabric loop 22' and 23' attached to the opposite ends of the pouch 12. The releasable latching device 24 as described permits the pouch 12 to be placed either on the left hip or right hip with the adjustable end 32 of the shoulder strap 14 facing forwardly.

The waist strap 16 is made up of a strong fabric webbing or other standard luggage strap material of the same type as employed with the shoulder strap 14. The waist strap 16 is releasably connected to the pouch 12 by a buckle attachment device. The buckle attachment device includes a corresponding male buckle end 28 connecting with a female buckle-receiving connector 27 attached to a lateral fabric loop 26 at opposite ends of the pouch 12, as shown in FIGS. 1 and 2, and a length adjustment device 40 on each adjustable end loop of the strap 16.

The pouch 12 is of conventional construction including suitable pockets 42 and 43, a cover flap 44 which serves as a releasable closure over one or more inner compartments in the pouch, and a hand grip. The pouch may be made up of any standard material customarily used in the construction of a fishing pouch or creel but is preferably of a flexible waterproof material which will comfortably ride against the hip of the wearer.

A rod suspension device supports or suspends a fishing rod R across the front of the fisherman's body and includes a supporting fabric loop 46, a connecting ring 52, and a rod suspension clip 50. The supporting fabric loop 46 is secured to the bottom of the bag, the supporting fabric loop having upper spaced attaching ends 47 and a lower closed end 48 and sized to receive the lower grip end or handle H of the fishing rod R, the diameter of the supporting fabric loop being less than the diameter of the fishing reel D on the grip end, thereby preventing the rod R from slipping through the loop 46. Preferably, a second corresponding supporting loop 46 is suspended from the opposite end of the pouch 12 to enable the rod R to be supported when worn on the left side of the fisherman.

As best seen from FIG. 3, a rod suspension clip 50 is affixed to the D-ring 23 by a connecting ring 52. The clip 50 is preferably of the type having a spring-loaded pin 54 and thumb button 55 which will permit selective opening of the clip for insertion of a section of the fishing rod as illustrated in FIGS. 2 and 3. A swivel end 56 is secured to a generally loop-shaped attaching end 58 through which the connecting ring 52 is inserted, the connecting ring 52 being in the form of a spiral, spring-like element having opposite spring ends which can be separated to permit advancement onto each of the respective D-ring 23 and loop 58 in a well-known manner.

The connecting ring 52 also serves as a means for mounting of a generally rectangular magnetic plate 60 having a central bore 62 for insertion of the ring and a relatively broad flat surface area 64 to serve as a convenient work surface to hold flies, hooks, lures, weights, tools, etc. while rigging the line within full view of the fisherman. In this way, the clip 50 will support the plate 60 upwardly to hold different accessories thereon.

From the foregoing, it will be appreciated that the waist belt 16 is capable of relieving the substantial weight of the bag and its contents from the shoulder and placing it more on the upper torso or hips much in the same manner as a fanny pack. The shoulder strap 14 enables the wearer to loosen the waist strap 16 to move the bag from the back or side of the hip to the front of the hip without sliding down the wearer's body. When the bag or pouch 12 is placed behind the hip position, the wearer can then raise the shoulder slightly to cause the pouch to rise on the back of the hip while simultaneously tightening the waist belt 16. This insures that the weight will be more on the hip than on the shoulder and can be done with one hand when the other hand is holding the fishing rod. Moreover, the height of the fishing rod suspended from the bag or pouch 12 using the rod suspension device will vary depending upon the part of the body supporting the pouch 12. For example, the height of fishing rod R will be higher if the pouch 12 is supported by the waist as opposed to when the pouch 12 is supported by the hip. The D-ring 36, which is normally used for suspending a fishing net, can be connected to the spring clip 21 in order to temporarily or quickly shorten the shoulder strap 14, for example, when the fisherman is standing in deep water.

Various modifications and changes may be made in the specific construction of the fishing pouch 12 a well as shoulder strap 14 and waist strap 16 without departing from the scope of the invention, particularly in the type of latching and adjustment devices employed in the straps and the means of attachment to the pouch. Similarly, the exact placement of the loops 46 may be modified as well as the type of rod clip 50 and its location of attachment to the shoulder strap. Similarly, the magnet 60 may be modified in construction as well as its location of attachment; and, for example, may be attached directly to the pouch 12 or to a fishing vest or jacket in place of the carrier 10 as illustrated. Correspondingly, the rod holder assembly consisting of a loop 46 and rod clip 50 may be affixed to different articles, such as, for example attaching the loop element 46 directly to the lower end of a fishing jacket or waist strap and the rod clip 50 to an intermediate or upper portion of the fishing vest or jacket to carry out the intended function and use of the present invention.

It is therefore to be understood that the above and other modifications and changes may be made in the carrier of the present invention as well as associated rod holder without departing from the spirit and scope of the invention as defined by the appended claims.

I claim:

1. In an improved carrier for fishing accessories including a pouch for holding fishing accessories which is adapted to be suspended from the body of a fisherman thereby allowing the fisherman to support said pouch using one particular part of the body, wherein the improvement comprises:

carrying means including an adjustable shoulder strap and an adjustable waist strap, said adjustable shoulder strap terminating in a first fixed end loop and a second adjustable end loop each of which is releasably connected to said pouch, said waist strap having two adjustable end loops each of which is releasably connected to said pouch directly below the area of connection of said first and second end loops of said shoulder strap, said carrying means adapted to allow the fisherman to suspend said pouch from several different areas of the body depending on the length adjustment of the adjustable straps;

rod suspension means for suspending a fishing rod from said pouch at a variable height depending upon the height of said pouch, said rod suspension means including a supporting fabric loop, a connecting ring, and a rod suspension clip, said supporting fabric loop having two upper spaced attaching ends secured to the bottom of said pouch and a lower closed end for receiving the handle of a fishing rod, said supporting fabric loop having a diameter less than the diameter of a standard fishing reel thereby holding the fishing rod at a variable height depending upon the height of said pouch, said rod suspension clip releasably attached to said connecting ring, said connecting ring releasably attached to the top of said pouch, said rod suspension clip having a spring-loaded pin and a thumb button for selective opening of said spring clip to permit insertion of a section of a fishing rod, thereby suspending the fishing rod from said pouch at a predetermined angle; and a magnetic plate having a central bore, said connecting ring releasably connected to said magnetic plate through said central bore, said magnetic plate providing a convenient work surface for holding fishing accessories.

2. The improved carrier for fishing accessories of claim 1 wherein said rod suspension means includes:

a second supporting fabric loop attached to an opposite side of said pouch from said supporting fabric loop for wearing said pouch on either the right side or left side of the body.

3. A carrier for fishing accessories comprising:

a pouch for holding fishing accessories;

carrying means connected to said pouch for suspending said pouch from a fisherman's body thereby allowing a fisherman to comfortably carry said pouch without using his arms; and suspension means for releasably suspending a fishing rod from said pouch at a predetermined angle whereby said fishing rod is suspended close to said pouch and the fisherman's hands are free to place lures, rig a line, or perform other operations without holding the fishing rod.

4. The carrier for fishing accessories of claim 3 wherein:

said pouch is bilaterally symmetrical allowing the fisherman to utilize said pouch on the left side or right side of the body.

5. The carrier for fishing accessories of claim 3 wherein said pouch includes:

one or more pockets forming one or more outer compartments on said pouch; and a cover flap forming a releasable closure over an inner compartment of said pouch.

6. The carrier for fishing accessories of claim 3 wherein said carrying means includes:

at least one strap, such as a waist strap or a shoulder strap of a variable length allowing the fisherman to carry said pouch using different parts of the body, such as, the hip, shoulder, or back.

7. The carrier for fishing accessories of claim 6 wherein said strap includes:

a releasable latching device, such as a spring clip or buckle attachment, attached to a first end and a second end of said strap forming a releasable connection between said strap and said pouch.

8. The carrier for fishing accessories of claim 3 wherein said carrying means includes:

a shoulder strap of variable length connected to said pouch; and a waist strap of variable length connected to said pouch.

9. The carrier for fishing accessories of claim 3 wherein:

said suspension means suspends the fishing rod at an acute angle extending upwardly from the fisherman's body whereby the fisherman's hands are free to place lures, rigging a fishing line or perform other operations.

10. The carrier for fishing accessories of claim 3 wherein said plate magnetically holds said fishing accessories.

11. The carrier for fishing accessories of claim 3 wherein said plate is of a generally rectangular shape.

12. A fishing pouch with rod carrier comprising:

a pouch having a first and second upper fabric loop attached to the top of said pouch, said first upper fabric loop is positioned on an opposite side of said pouch from said second upper fabric loop, first and second upper D-rings attached to said first and second upper fabric loops, first and second lateral fabric loops, said first lateral fabric loop attached to said pouch directly beneath said first upper fabric loop, said second lateral fabric loop attached to said pouch directly beneath said second upper fabric loop, a buckle-receiving connector attached to each of said first and second lateral fabric loops, one or more pockets on the outer body of said pouch forming one or more outer compartments in said pouch, and a cover flap forming a releasable closure over said inner compartment of said pouch;

a shoulder strap of variable length terminating in a first end and a second end, said first end defined by an end loop of fixed size, said second end defined by an adjustable end loop of variable size, a conventional length-adjustment device associated with said adjustable end loop for changing the size of said shoulder strap, a releasable latching device attached to each of said first and second end loops of said shoulder strap for a releasable connection of said shoulder strap to said pouch;

a D-ring attached to said shoulder strap for suspending a fishing net, said D-ring positioned between said first loop end and said second loop end of said shoulder strap; a waist strap of variable length terminating in a first and second end, each of said first and second ends defined by an adjustable end loop, a complementary buckle on each of said first and second ends for connecting to said buckle-receiving connector on each of said first and second lateral fabric loops on said pouch, and a length adjustment device associated with each of said first and second adjustable end loops on said waist strap for adjusting the length of said waist strap;

a supporting fabric loop for supporting a fishing rod from said pouch, said supporting fabric loop having two upper spaced attaching ends secured to the bottom of said pouch, said supporting fabric loop having a lower closed end for receiving the handle of a fishing rod, said supporting fabric loop having a diameter less than the diameter of a standard fishing reel thereby holding the fishing rod at a variable height, said height determined by the height of said pouch;

a rod suspension device having a rod-suspension clip, said rod-suspension clip having a spring-loaded pin and a thumb button for selective opening of said spring clip to permit insertion of a fishing rod, said spring clip having a swivel end opposite said spring clip, said swivel end attached to a generally loop-shaped attaching end, said loop-shaped attaching end releasably connected to a connecting ring, said connecting ring connected to said first upper D-ring on said first upper fabric loop of said pouch; and a magnetic plate of a generally rectangular shape, said magnetic plate having a relatively broad flat surface area forming a work surface to hold fishing accessories, said magnetic plate having a central bore, said connecting ring connected through said central bore in said magnetic plate.

13. The fishing pouch with rod carrier of claim 12 wherein said pouch includes:

a hand grip attached to the top of said pouch.

14. The fishing pouch with rod carrier of claim 12 wherein:

said pouch is made from a flexible waterproof material.

15. The fishing pouch with rod carrier of claim 12 wherein:

said shoulder strap is of sufficient length to extend across the back and one shoulder, then downwardly across the chest of an adult person.

16. The fishing pouch with rod carrier of claim 12 wherein:

said shoulder strap is made from a standard luggage strap material; and said waist strap is made form a standard luggage strap material.

17. The fishing pouch with rod carrier of claim 12 wherein:

said releasable latching device on said shoulder strap is a spring clip.

18. The fishing pouch with rod carrier of claim 12 further including:

a second supporting fabric loop attached to the opposite side of said pouch from said supporting fabric loop thereby allowing the pouch to be worn on either the right side or left side of the fisherman.

19. The fishing pouch with rod carrier of claim 12 wherein:

said connecting ring is a generally spiral, spring shaped element which can be separated to permit advancement of said connecting ring onto said magnetic plate, thereby providing a means for releasing the connection between said connecting ring and said magnetic plate.

20. The fishing pouch with rod carrier of claim 12 wherein:

said releasable latching device on said first end loop of said shoulder strap connects to said D-ring on said shoulder strap for quick but temporary length shortening of said shoulder strap.

21. A carrier for fishing accessories comprising:

a pouch for holding fishing accessories;

carrying means connected to said pouch for suspending said pouch from a fisherman's's body; and suspension means for releasably suspending a fishing rod from said pouch at an acute angle extending upwardly from the fisherman's body, whereby the fisherman's hands are free to place lures, rig a line or perform other operations said suspension means including spaced supporting loops attached to said pouch for supporting the fishing rod, one of said supporting loops having a diameter less than then diameter of the reel of a standard fishing rod thereby restricting movement of the fishing rod.

22. The carrier for fishing accessories of claim 21 wherein another of said supporting loops includes a rod suspension device comprising:

a spring clip having a spring-loaded pin and a thumb button located on one end of said spring clip, said spring-loaded pin and said thumb button allowing selective opening of said spring clip for insertion of a fishing rod;

a swivel end located on the opposite side of said spring clip from said spring pin; and a generally loop-shaped attaching ring attached to said swivel end;

a connecting ring connected through said loop-shaped attaching end, said connecting ring forming a releasable connection between said rod suspension device and said pouch.

23. The carrier for fishing accessories of claim 22 further including:

a magnetic plate having a broad flat surface area and a central bore, said connecting ring extending through said central bore thereby connecting said magnetic plate to said rod suspension device.

* * * * *